(12) United States Patent
Unnerstall et al.

(10) Patent No.: US 12,499,634 B2
(45) Date of Patent: Dec. 16, 2025

(54) SYSTEMS AND METHODS FOR GENERATING AUGMENTED REALITY-BASED CONTENT

(71) Applicant: MASTERCARD INTERNATIONAL INCORPORATED, Purchase, NY (US)

(72) Inventors: Rick Unnerstall, O'Fallon, MO (US); Jacob Luebbers, St. Peters, MO (US); Sunil Mandava, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 174 days.

(21) Appl. No.: 18/461,262

(22) Filed: Sep. 5, 2023

(65) Prior Publication Data
US 2025/0078415 A1   Mar. 6, 2025

(51) Int. Cl.
G06T 19/00 (2011.01)
G06Q 30/0241 (2023.01)

(52) U.S. Cl.
CPC ....... G06T 19/006 (2013.01); G06Q 30/0277 (2013.01)

(58) Field of Classification Search
CPC .......................... G06T 19/006; G06Q 30/0277
See application file for complete search history.

(56) References Cited

U.S. PATENT DOCUMENTS

| | | |
|---|---|---|
| 9,449,343 B2 | 9/2016 | Mayerle |
| 10,573,084 B2 | 2/2020 | Callaghan |
| 10,692,325 B2 | 6/2020 | Simons |
| 11,017,611 B1 * | 5/2021 | Mount .................. G06V 20/20 |
| 11,194,399 B2 | 12/2021 | Li |
| 11,200,892 B1 | 12/2021 | Stoops |
| 11,393,089 B2 | 7/2022 | Dawson, Jr. |
| 11,430,216 B2 | 8/2022 | Gupta |
| 11,636,438 B1 | 4/2023 | Huang |
| 11,670,081 B2 * | 6/2023 | Chastain ................ G06T 11/00 |
| | | 345/633 |
| 11,967,147 B2 * | 4/2024 | Kreiner .................... G07C 9/23 |
| 2019/0334619 A1 * | 10/2019 | Aoyama ................ G06V 10/22 |

(Continued)

FOREIGN PATENT DOCUMENTS

| | | | | |
|---|---|---|---|---|
| KR | 20250031145 A | * | 3/2025 | |
| WO | WO-2020031795 A1 | * | 2/2020 | .......... G02B 27/017 |

*Primary Examiner* — Chante E Harrison
(74) *Attorney, Agent, or Firm* — Armstrong Teasdale LLP

(57) ABSTRACT

An augmented reality (AR) system for generating augmented reality reservation content using an AR computing device and an AR display device operated by a user is disclosed. The AR system is configured to receive, from the AR display device, image data, at least one user input, and geolocation data. The AR computing device is configured to process the image data using object recognition and the geolocation of the user to identify at least one object The AR computing device is further configured to communicate with an application programming interface (API) to obtain reservation data associated with the identified at least one object. The AR computing device is further configured to generate AR content associated with the received reservation data. The AR display device is configured to display the AR content on a display screen of the AR display device.

20 Claims, 7 Drawing Sheets

(56) References Cited

U.S. PATENT DOCUMENTS

| | | |
|---|---|---|
| 2020/0162851 A1 | 5/2020 | Wilde |
| 2022/0135228 A1 | 5/2022 | Morrison |
| 2022/0391618 A1 | 12/2022 | Moton, Jr. |
| 2023/0171614 A1 | 6/2023 | Huang |
| 2023/0217255 A1 | 7/2023 | Kahn |
| 2023/0377295 A1* | 11/2023 | Angevine .............. G06Q 50/16 |

* cited by examiner

SYSTEMS AND METHODS FOR GENERATING AUGMENTED REALITY-BASED CONTENT

BACKGROUND

This disclosure relates generally to augmented reality systems and, more specifically, to systems and methods for generating augmented reality content that may be presented by overlaying the content on a display screen.

The term "augmented reality" (AR) generally refers to a view of a physical, real-world environment of a viewer where certain elements in the view (or AR view) are augmented by computer-generated sensory input, such as sound, video, or graphics data. The computer-generated (CG) elements may be purely computer-generated or generated using a real-world object that is in the viewer's physical environment or is remotely located from the viewer. Within the view, the CG elements appear to be superimposed onto the viewer's physical environment to create an augmented reality as distinct from the viewer's physical reality. In some implementations, the viewer will use an AR display device to see the AR view. AR display devices may include glasses, goggles, head-up displays (e.g., on a car windshield), or the like. Additionally, a viewer will often have one or more optical instruments, such as cameras, for recording or capturing images of the viewer and the viewer's environment. These cameras may be used to record the viewer's movements for later viewing or transmission as well.

Some known systems' use of AR is quite limited. For example, some known AR-using systems are limited or unable in their ability to present CG elements that are associated with reservation information. Some other known AR-using systems are unable to present CG elements that can be used by the viewer for a specific purpose (e.g., to book a room at a hotel). Other known AR-using systems do not enable the viewer to interact with the CG element, leading to a less engaging experience. For example, these known systems do not enable the viewer to interact with a CG element where the CG element updates its appearance or causes an update to the view in the viewer's AR display device.

In addition to AR systems, there are also computer systems that are virtual reality (VR) based computer systems. VR-based systems are different from AR systems in that the user's view is entirely computer-generated. VR systems immerse users in a digital environment (e.g., through a VR headset), such that the user is effectively positioned within a "virtual" world.

BRIEF DESCRIPTION

In one aspect, an augmented reality (AR) system for generating AR-based reservation using at least one AR computing device and at least one AR display device operated by a user is provided. The AR system is configured to receive, from the AR display device, image data, at least one user input, and geolocation data. The AR computing device is configured to process the image data using object recognition and the geolocation of the user to identify at least one object. The AR computing device is further configured to transmit, by the AR computing device via an API, an electronic request message, the electronic request message requesting reservation data associated with the identified at least one object and the at least one user input. The AR computing device is further configured to receive, by the AR computing device from the API, an electronic response message, wherein the electronic response message includes reservation data associated with the identified at least one object and the at least one user input. The AR computing device is further configured to generate, by the AR computing device, AR content associated with the received reservation data and display, by the AR display device, the AR content on a display screen of the AR display device.

In another aspect, a computer-implemented method for generating augmented reality (AR)-based profiles using an augmented reality (AR) system including at least one AR computing device and at least one AR display device operated by a user is provided. The method includes receiving, by the AR computing device from the AR display device, image data, at least one user input, and geolocation data. The method also includes processing, by the AR computing device, the image data using object recognition and the geolocation data to identify at least one object. The method further includes transmitting, by the AR computing device via an API, an electronic request message, the electronic request message requesting reservation data associated with the identified at least one object and the at least one user input. The method further includes receiving, by the AR computing device from the API, an electronic response message, wherein the electronic response message includes reservation data associated with the identified at least one object and the at least one user input. The method further includes generating, by the AR computing device, AR content associated with the received reservation data. The method further includes displaying, by the AR display device, the AR content on a display screen of the AR display device.

In yet another aspect, a non-transitory computer readable medium that includes computer-executable instructions for generating augmented reality reservation content using an AR computing device and an AR display device operated by a user, the AR computing device being communicatively coupled to the AR display device and an application programming interface (API) is provided. When the computer-executable instructions are executed by the AR computing device, the computer-executable instructions cause the AR computing device to receive, from the AR display device, image data, at least one user input, and geolocation data. The instructions further cause the AR computing device to process the image data using object recognition and the geolocation data to identify at least one object. The instructions further cause the AR computing device to transmit, via the API, an electronic request message, the electronic request message requesting reservation data associated with the identified at least one object and the at least one user input. The instructions further cause the AR computing device to receive, by the AR computing device from the API, an electronic response message, wherein the electronic response message includes reservation data associated with the identified at least one object and the at least one user input. The instructions further cause the AR computing device to generate AR content associated with the received reservation data and cause the AR content to be displayed on a display screen of the AR display device.

BRIEF DESCRIPTION OF THE DRAWINGS

FIG. 1 is a simplified block diagram of an example augmented reality (AR) system.

FIG. 2 illustrates an example display of augmented reality (AR)-based reservations using an AR display device included in the AR system shown in FIG. 1.

FIG. 3 illustrates another example display of augmented reality (AR)-based reservations using an AR display device included in the AR system shown in FIG. 1.

FIG. 4 illustrates an example configuration of the AR display shown in FIG. 1.

FIG. 5 illustrates an example configuration of an AR computing device included in the AR system shown in FIG. 1.

FIG. 6 is an example method for generating augmented reality-based reservation content in the form of certain computer-generated (CG) elements superimposed onto the user's physical environment or an image of a physical environment.

FIG. 7 illustrates an example configuration of a database within a computing device, along with other related computer components, that may be used to generate and display computer-generated (CG) elements using AR data.

Like numbers in the Figures indicate the same or functionally similar components.

DETAILED DESCRIPTION

Figure 1:
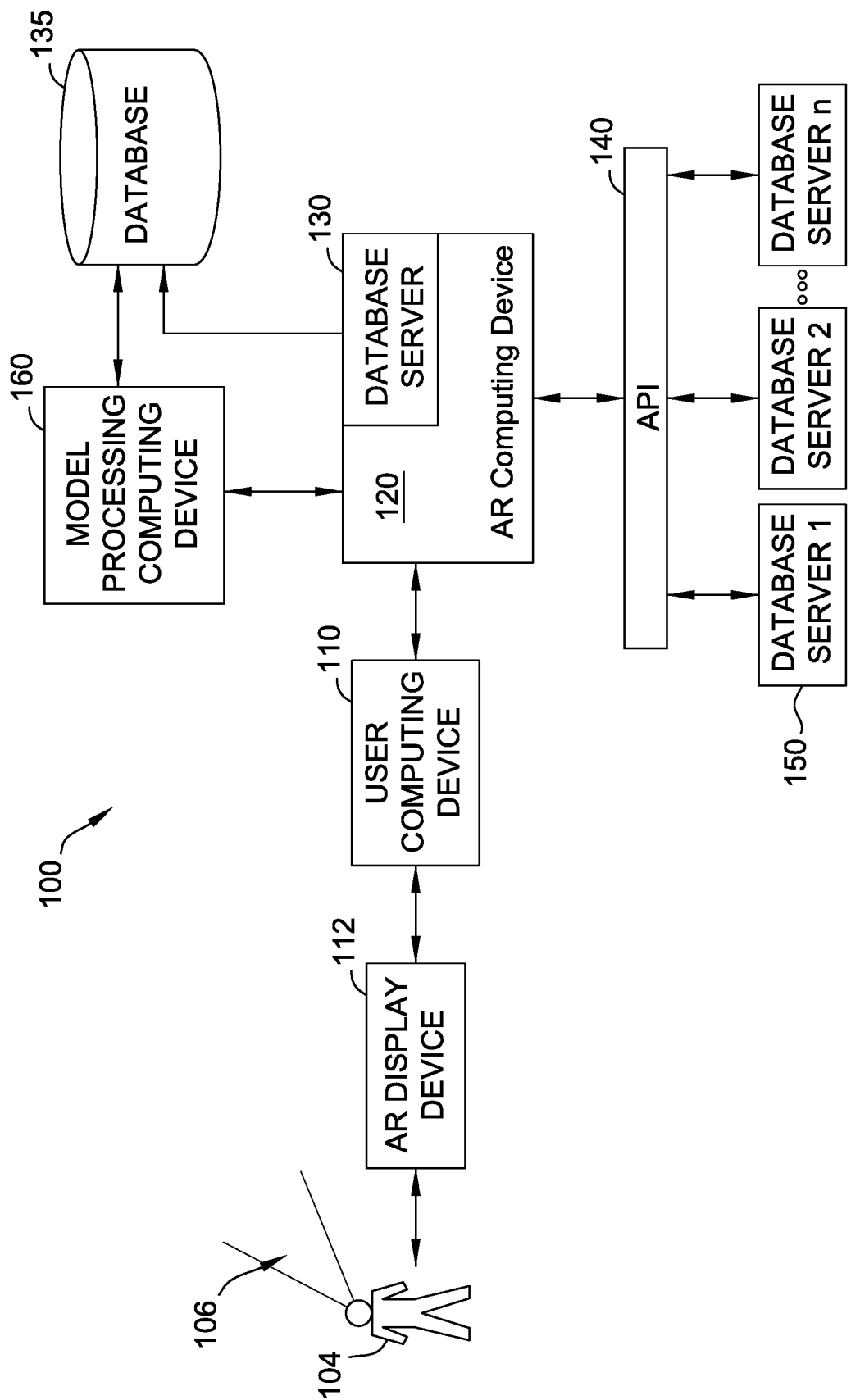
FIGS. 1-7 show example embodiments of the methods and systems described herein.

The systems and methods described herein relate generally to generation and display of reservations (e.g., hotel reservations, event reservations, and the like) using an augmented reality (AR) computing system. More specifically, the systems and methods described herein include an augmented reality (AR) computing device. The AR computing device provides reservation information (e.g., availability, pricing, and the like) to users by generating augmented reality (AR) reservation content that is displayed and/or overlayed on a user display device. The AR computing system enables users to view the augmented reality-based reservation content in the form of certain computer-generated (CG) elements superimposed onto the user's physical environment or an image of a physical environment (e.g., an image of a user's current physical environment, a satellite image, an aerial image, an interactive panoramic view of streets, and the like). An overview of example embodiments is provided herein. Although much of this description relates to the use of the AR systems in the context of reservations, it should be understood that the systems and methods described herein are not limited to such a use only. The systems and methods described herein could be used in many other applications as well where location, availability, and/or pricing information may be needed.

The AR system may be implemented for a variety of types of reservations. Such activities may include hotel reservations, event reservations (e.g., concerts, sporting events, shows, and the like), office space reservations, short and long-term rental reservations (e.g., houses, condominiums, apartments, and the like), or any other reservation where location, availability, and/or pricing information may be needed.

In the example embodiment, the AR computing device is configured to, in real-time, identify an object or a group of objects being displayed on a user display device, request and receive reservation data for one or more units within the object or group of objects from one or more data sources via an application programming interface (API), generate AR reservation data using the AR-based reservation information for the one or more units, and cause the AR reservation data to be displayed within the one or more units on the AR display device. As defined herein, real-time relates to the onboarding system processing data within a short period of time (e.g., from about milliseconds to minutes, or hours, as opposed to a matter of days) so that the data output and/or input is available virtually immediately for ultimate display on a user device. The AR computing device is also configured to store one or more of the received data within a database in communication with the AR computing device.

The AR computing device may request and receive data such as availability data (e.g., which hotel rooms are available, which seats are available, which office spaces are available, and the like), pricing data (e.g., the cost of a particular hotel room per night, the cost of a particular seat for a sporting event, the cost of renting a particular office space for a week, and the like), rating data (e.g., the average customer rating associated with a hotel and/or one or more particular rooms within a hotel, the average customer rating associated with one or more particular seats or a section of seats within an arena, the average customer rating associated with a particular office space of group of office spaces), loyalty gamifying opportunities (e.g., hotel loyalty points), a discount, an advertisement, and/or other data that enables the AR computing device to function as described herein.

The AR computing device may also sync with contact data from a user's contact list stored on the user computing device. The AR computing device may request and receive reservation data (e.g., hotel rooms, arena seating, office spaces, and the like) associated with the user's contacts. The AR computing device may generate CG elements (e.g., a see-through element) to show where a user's contact has booked a room, a seat, an office space, and the like.

The AR computing device may request and receive such reservation data (e.g., availability data, pricing data, rating data, and the like) from one or more data sources via one or more APIs. The AR computing device may further receive advertisements, discounts, and the like, associated with the one or more objects within the user's field of view. Additionally, or alternatively, AR computing device may further receive advertisements, discounts, and the like associated with one or more objects not within the user's field of view, but that are nearby. The advertisement and/or discount may be accompanied by an indication (e.g., an arrow) pointing in a direction of the corresponding object. The data sources may be associated with hotel companies, ticket sale and distribution companies, real estate sale, rental companies, crowd-source review companies, and the like.

In some embodiments, the AR computing device is configured to generate CG elements within one or more units of an object or a group of objects. In some embodiments, one or more first-type CG elements comprise a see-through element which highlights one or more units of an object in the user's field of view. For example, the one or more first-type CG elements comprises an element which highlights one or more hotel rooms on a hotel building, one or more seats or sections within an arena or other performance venues, one or more office spaces on an office building, or a house or condominium rental. The first-type CG elements may comprise a see-through element which highlights an object or a group of objects in the user's field of view. For example, if a user is looking at the front side of a hotel (e.g., through a viewing device), the first-type CG elements may comprise see-through elements which highlight available rooms facing the front of the hotel. Additionally, or alternatively, the first-type CG elements may include an indication, such as text or an arrow, indicating a location of an object or a group of objects not in the user's field of view. For example, if a user is looking at the front side of a hotel and there are available rooms at the back of the hotel, there may be first-type CG elements which indicate a unit of available hotel rooms at the back of the hotel. In some embodiments, one or more second-type CG elements include additional information about the highlighted unit(s). For example, the one or more second-type CG elements may comprise a price associated with the highlighted unit(s) (e.g., the cost per night for a selected date, per week, per month or the cost for a particular event) and/or a rating associated with the one or more highlighted unit(s). The one or more second-type CG elements may be positioned next to the one or more first-type CG elements which highlight the unit(s). In some embodiments, one or more third-type CG elements may correspond to a message or communication session. In some embodiments, one or more fourth-type CG elements may comprise a link to a merchant web page or application which enables user to easily book a room at a hotel, an office space, a rental, seats, and the like. In some embodiments, one or more fourth-type CG elements (now shown) may comprise a link to a merchant web page or application which enables user to easily book a room at a hotel, an office space, a rental, seats, and the like.

In some embodiments, the AR system may include other computing devices and/or systems in communication with the AR computing device. The user computing device may be in communication with computing devices and/or systems via network connections, such as the Internet, LAN/WAN, BLUETOOTH™, Wi-Fi, or other connections capable of transmitting data across computing devices. Such computing devices and/or systems may include one or more merchant computing devices, a payment processor computing device, or any other suitable devices that enable the AR system to function as described herein.

In some embodiments, the user computing device comprises a web-enabled phone (e.g., a "smartphone"), a personal digital assistant (PDA), a desktop computer, a laptop computer, a cellular phone, a tablet, a phablet, a wearable device (e.g., smart glasses or goggles) or other web-based connectable equipment the user may use to communicate with AR computing device. In some embodiments, the user computing device is communicatively coupled to an AR display device. Additionally, or alternatively, the AR display device may be integrated with the user computing device. For example, in some embodiments, the AR display device is a display of a web-enabled phone (e.g., a "smartphone"), a personal digital assistant (PDA), a desktop computer, a laptop computer, a cellular phone, a tablet, a phablet, or other web-based connectable equipment. In some embodiments, the AR display device comprises a see-through, near-eye, mixed reality display device (e.g., HOLOLENS™ by Microsoft, GLASS™ by Google). In some embodiments, the AR display device may be a pair of goggles, a pair of glasses, one or more contact lenses, a handheld device or screen, a fixed screen (such as a vehicle windshield or other surface), or the like. More generally, the AR display device may be any surface or screen that a viewer may look at to see the viewer's physical environment but that also enables the viewer to view certain CG elements superimposed onto the viewer's view of the physical environment. These CG elements may appear two-dimensional or three-dimensional. As an example, the CG elements may be a three-dimensional (3D) rendering. In the example embodiment, the AR computing device generates these CG elements and transmits them to the AR display device for the viewer to view.

The AR display device may also include embedded or communicatively coupled input/output devices to enable the viewer to interact with the AR display device. For example, the AR display device may have a camera device embedded or attached, enabling the AR display device to capture and record images directly. The AR display device may also include a microphone to receive voice commands, a speaker to transmit audio outputs, or the like. In some embodiments, the AR display device may also be an AR computing device. That is, the AR display device may generate some or all CG elements itself as well. Additionally, or alternatively, the AR display device may be a component of the user computing device. For example, the AR display device may be a display of the user computing device.

In some embodiments, the AR display device is configured to receive data from a user of the AR display device via a user computing device, and/or user eye movement, hand gestures (e.g., tapping swiping, or input commands for the AR display device that are virtually displayed by the AR display device), or other input modes detected by the AR display device. The user may input data, such as user input data, into the user computing device which transmits the user input data to the AR display device. The AR display device may transmit the user input data to the AR computing device. The AR computing device may store the user input data within a database in communication with the AR computing device. The user input data may include a date or a range of dates the user would like to make a reservation, a type of show, performance, concert, or sporting event the user would like to attend, a specific show, performance, concert, or sporting event the user would like to attend, a specific room, office space, seat, or the like the user would like to see further information on, and any other information that enables the AR system to function as described herein. AR computing device may include the user input data in the electronic request message to the API in order to retrieve the information of interest to the user. Additionally, or alternatively, the user inputs may include instructions for adding a bounding frame around one or more objects or one or more units within an object, identifying an unidentified object, changing display options of the AR environment, or any other instruction from the user. User inputs may be received through any combination of hand gestures, eye movements, spoken or audio commands, text inputs, mouse inputs, keyboard inputs, touchscreen inputs, and/or any other user inputs. AR computing device is further configured to display other virtual elements not directly related to reservation and availability information, such as virtual elements associated with user inputs (e.g., bounding frames, hand gestures, and other illustrations of user inputs) and menu or other display data (e.g., menus, buttons, toolbars, or other controls).

In some embodiments, AR computing device allows the user to simultaneously switch between AR and VR environments, such that the user may be viewing an AR environment and switch to a VR environment (e.g., VR environment), or vice versa. The AR computing device may seamlessly switch between displaying AR and VR environments to the user based upon user inputs, or some other external factor, such as a change in geolocation data or sensor input data. In one example, the user is viewing a street in an AR environment, such that a hotel located on the street is overlaid with one or more CG elements which provide information regarding availability and pricing of rooms within the hotel. However, the user may desire to see the location, availability, and pricing of hotel rooms located on the backside of a hotel without walking behind the hotel. As such, the user may input a command to navigate the view of the digital environment away from user's real-world position, causing the AR computing device and the MP computing device to transition the user out of the AR environment and into a VR environment which presents the location, availability, and pricing information of rooms located on the backside of the hotel.

In some embodiments, a model for predicting availability data, pricing data, and the like may be generated. The untrained ML prediction model may be trained with training data, such as historical data, to predict the availability, pricing, and the like for future dates. For example, if a user would like to book a hotel room for Christmas week, but the availability and pricing information is not yet available, the prediction model may predict availability, pricing, and the like. In some embodiments, the output of ML prediction model may comprise a prediction of when the hotel will be booked (e.g., the hotel will be 70% booked by August 1, 80% booked by September 1, and 90% booked by October 1), when prices will jump (e.g., the average price for a room will go up 30% from September 1 to October 1), and the like.

In some embodiments, a ML payment recommendation model may be developed to provide a recommendation on a form of payment when booking a reservation. The untrained ML payment recommendation model may be trained with training data to generate a recommendation on which form of payment (e.g., credit card, payment account, and the like) stored in a user's digital wallet. The recommendation may be based on points, rewards, and other incentives offered by each form of payment. For example, the ML payment recommendation model may determine that if user pays for a reservation with a first credit card, they will earn more points than if they book the reservation with a second (different) credit card. In such a case, the ML payment recommendation model will recommend the user pay with the first credit card.

The methods and system described herein may be implemented using computer programming or engineering techniques including computer software, firmware, hardware, or any combination or subset. As disclosed above, at least one technical problem with prior systems is they are unable to use AR's various capabilities to improve the reservation process. There is a need to more easily provide relevant reservation information to consumers, and consequently provide a more seamless booking experience for consumers. The systems and methods described herein address that technical problem. The technical effect of the systems and processes described herein is achieved by performing at least one of the following steps: (a) receive, by the AR computing device from the AR display device, image data, at least one user input, and geolocation data, (b) process, by the AR computing device, the image data using object recognition and the geolocation data to identify at least one object, (c) transmit, by the AR computing device to the API, an electronic request message, the electronic request message requesting reservation data associated with the identified at least one object and the at least one user input, (d) receive, by the AR computing device from the API, an electronic response message, wherein the electronic response message includes reservation data associated with the identified at least one object and the at least one user input, (e) generate, by the AR computing device, AR content associated with the received reservation data; and (f) display the AR content on a display screen of the AR display device.

In some embodiments, a computer program is provided, and the program is embodied on a computer-readable medium. In an example embodiment, the system is executed on a single computer system, without requiring a connection to a service provider computing device computer. In a further example embodiment, the system is being run in a Windows® environment (Windows is a registered trademark of Microsoft Corporation, Redmond, Washington). In yet another embodiment, the system is run on a mainframe environment and a UNIX® service provider computing device environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In some embodiments, a computer program is provided, and the program is embodied on a computer-readable medium and utilizes a Structured Query Language (SQL) with a client user interface front-end for administration and a web interface for standard user input and reports. In another embodiment, the system is web enabled accessible via the internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Service provider computing device, Sybase®, and PostgreSQL. However, any database may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

Object Recognition Model in Real-World Environment

In some embodiments, machine learning (ML) (e.g., artificial intelligence or "AI") systems use training data to train a ML model, and the trained model may be used for processing subsequent data inputs. In some embodiments, an ML model may be trained to perform object recognition in a real-world environment (e.g., a user's physical environment, a satellite image, an aerial image, an interactive panoramic views of streets, and the like). In one example, an ML model may be developed for identifying and recognizing objects detected in a real-world environment. Training data for the ML model may include 3D models with objects delineated and labeled (e.g., a hotel is outlined and labeled as a hotel). The untrained ML model may be trained with such training data and learn to identify different objects in an environment.

In some embodiments, a ML model may be developed for recognizing whether an image contains a hotel, an office space, a rental property, a theater, an arena, or the like. In such an example, training data may include a large number of images, where each image is labeled as containing or not containing a hotel, an office space, a rental property, a theater, an arena, or the like. The untrained ML model may be trained with the training data to identify if an image contains a hotel, an office space, a rental property, a theater, an arena, or the like.

In a more complex system, a ML model may be developed to not only recognize if an image contains a hotel, an office space, a rental property, a theater, an arena, or the like, but also to outline or highlight objects or a group of objects within the hotel, office space, rental property, theater, or the like. In such a system, the training data may include a large number of images, each image not only labeled as containing or not containing a hotel, an office space, a rental property, a theater, an arena, or the like, but also including delineations indicating where specific rooms, office spaces, seats, and the like, are located in each image. The labels may be specific, so that the AR computing device may associate a specific room, office space, seat, and the like, with price data, rating data, and the like received from third-party computing device. The untrained ML model is trained on such training data to identify not only when an image contains a hotel, but also where specific rooms within the hotel are located on a hotel.

Generating training data is a crucial aspect of effectively training a ML model. For ML systems focused on object and image recognition, delineating and labeling objects accurately is paramount when preparing training data. In 2D images, the process of delineating and labeling the number of images required for effective training may be very time consuming, and the time requirement is increased in labeling objects in a 3D environment (e.g., due to increased difficulties with navigating 3D environments, performing input gestures within the 3D environment, and other limitations related to interfacing with a 3D environment through a 2D screen).

Certain techniques, such as segmentation, may be utilized for more effectively delineating objects in a 3D model. In some embodiments, a segmentation algorithm is applied to a bounded region in a 3D model, and a discrete outline of an object within the region is generated. For example, a bounding frame may be placed around a tree in a 3D environment and a segmentation algorithm may be applied to the bounding frame, thereby identifying a hotel as an individual object and more accurately bounding the hotel object. In another embodiment, a segmentation algorithm may be applied to an area including data points representing multiple objects, and at least one of the objects is identified. In some cases, GPS location data may also be provided to further aid in identifying the object based upon a location and/or mapping of where the object is located.

In an exemplary embodiment, semantic segmentation may be used to identify different classes of objects in a 3D model without making additional determinations about a specific label for each object. In other words, groups of data points are automatically identified as representing objects distinct from the rest of the environment, but beyond a general label such as "ground", "object 1", "object 2", etc., no qualitative label is assigned to the objects.

As used herein, "ML model" refers to any mathematical model, statistical model, decision-making model, algorithm, or function that includes machine learning functionality. A ML model may be trained or untrained. As used herein, "trained model" or "trained ML model" refers to any ML model that has been trained through the processing of training data. As used herein, "untrained model" or "untrained ML model" refers to any ML model that has not been trained through the processing of training data.

As used herein, "3D model" refers to data that represents an environment, a space, and/or environmental features (e.g., objects) in digital 3D. The 3D environment, space, and/or environmental features may be based upon a real-world environment or not. A 3D model may include, for example, a point cloud, a wireframe model, a surface model, a solid model, a mesh model, and/or any other type of model which represents an environment, space, or environmental features in a digital 3D space. Additionally, a 3D model based upon a real-world location may be geo-referenced to that location, such that at least some of the points of the 3D model have an associated geolocation. As used herein, "virtual environment" and "digital environment" refer to a rendering of a 3D digital environment based upon a 3D model and experienced by a user through a display device. In other words, a 3D model contains data which is rendered by a display device and displayed to the user as a virtual or digital environment.

As used herein, "environmental features" or "objects" may refer to objects, areas, aspects, features, or other elements of an environment.

In some embodiments, a ML prediction model may be developed to predict availability data, pricing data, and the like for future dates. The untrained ML prediction model may be trained with training data, such as historical availability and pricing data, to predict the availability, pricing, and the like for future dates. For example, if a user would like to book a hotel room for Christmas week, but the availability and pricing information is not yet available, the ML prediction model may predict availability, pricing, and the like. In some embodiments, the output of ML prediction model may comprise a prediction of when the hotel will be booked (e.g., the hotel will be 70% booked by August 1, 80% booked by September 1, and 90% booked by October 1), when prices will jump (e.g., the average price for a room will go up 30% from September 1 to October 1), and the like.

In some embodiments, a ML payment recommendation model may be developed to provide a recommendation on a form of payment when booking a reservation. The untrained ML payment recommendation model may be trained with training data to generate a recommendation on which form of payment (e.g., credit card, payment account, and the like) stored in a user's digital wallet. The recommendation may be based on points, rewards, and other incentives offered by each form of payment. For example, the ML payment recommendation model may determine that if user pays for a reservation with a first credit card, they will earn more points than if they book the reservation with a second credit card. In such a case, the ML payment recommendation model will recommend the user pay with the first credit card.

Virtual Reality and Augmented Reality

The use of VR and AR for interacting with a 3D model provides a new, efficient interface for delineating and labeling objects in 3D models. VR and AR systems allow a user to interact with a 3D virtual environment in a new way compared to traditional interactions using a 2D display. In VR, a user may be immersed in a virtual environment (e.g., using a VR headset). In other words, a VR device displays images, sounds, etc. to the user in a way that mimics how a user receives sensory stimuli in the real world. In AR, the user may be provided with digital data that overlays objects or environments in the real world. AR devices may use a camera or other input to determine the objects in a user's line of sight and present additional digital data that compliments the real-world environment.

As described in further detail herein, VR and AR technologies may be utilized to more effectively and efficiently carry out the process of labeling 3D models in preparation for model training. In some embodiments, a user interacts with a 3D model using VR. Specifically, the user navigates a virtual environment, applying bounding frames to objects, labeling objects, rotating views, and traversing areas of the virtual environment using a VR device. In other words, the user is immersed in a virtual environment and interacts with the virtual environment through the VR device in order to apply labeling data to the 3D model (e.g., apply labels and annotations) and identify objects in the 3D model (e.g., apply bounding frames, altering surface meshes, etc.).

In another embodiment, a user views a real-world environment and an AR device displays virtual content overlaying the real-world environment. Specifically, if the user is in a geographic location associated with the geographic location of a 3D model, the AR device may overlay the real-world environment with virtual objects from the 3D digital environment, allowing the user to interact with the digital environment and digital objects.

As used herein, "VR environment" refers to a digital or virtual environment experienced by or displayed to a user through a VR computing device. In other words, "VR environment" refers to the VR view and functionality experienced by a user through a VR enabled computing device. Conversely, any virtual or digital environment displayed to a user through a VR computing device may be considered a VR environment. As used herein, "AR environment" refers to a digital or virtual environment overlaid on a real-world environment and experienced by a user through a VR/AR computing device. In other words, "AR environment" refers to the AR display and functionality experienced by a user through an AR enabled computing device.

Exemplary Data Flow in Augmented Reality Reservation System

FIG. 1 is a simplified block diagram of an example augmented reality (AR) system 100, in which a variety of computing devices are communicatively coupled to each other via a plurality of network connections. These network connections may be Internet, LAN/WAN, BLUETOOTH™, Wi-Fi, or other connections capable of transmitting data across computing devices. AR system 100 includes an augmented reality (AR) computing device 120 comprising a database server 130, a database 135, a model processing (MP) computing device 160, a user computing device 110, and one or more application programming interfaces (APIs) 140 associated with one or more merchant computing devices 150. In some embodiments, user computing device 110 and database 135 are components of AR computing device 120. AR computing device 120 may be a service provider computing device, a network of multiple computer devices, a virtual computing device, or the like.

In some embodiments, AR computing device 120 is configured to receive image data from user computing device 110. The image data may be associated with a user's physical environment. For example, the image data may be captured by a camera of AR display device 112 and/or user computing device 110. MP computing device 150 is configured to receive the image data and process the image data using object recognition techniques (e.g., convolutional neural networks, histogram of oriented gradients feature extraction, edge matching, greyscale matching, gradient matching, interpretation trees, pose clustering, scale-invariant feature transform, speeded up robust features, or bag of words representations) to identify objects in the image or video. AR computing device 120 is further configured to cause to be displayed, on a display of user computer device 110, CG elements superimposed onto an object or a group of objects.

In some embodiments, user computing device 110 comprises a display which enables user 104 to view reservations and other relevant information in the form of certain computer-generated (CG) elements superimposed onto user's 104 view of the physical environment or a photographic image or video of a physical environment. In the example embodiment, AR computing device 120 generates these CG elements and transmits them to user computing device 110 for user 104 to view. AR computing device 120 may be in communication with other systems and/or computing devices. In the example embodiment, AR computing device 120 is in communication with one or more application programming interfaces (APIs) 140.

In some embodiments, the AR computing device is configured to generate CG elements within one or more units of an object or a group of objects. In some embodiments, one or more first-type CG elements comprise a see-through element which highlights one or more units of the user's physical environment or an image of a physical environment. For example, the one or more first-type CG elements comprise a see-through element which highlights one or more hotel rooms on a hotel building, one or more seats or sections within an arena or other performance venues, one or more office spaces on an office building, or a house or condominium rental.

Figure 2:
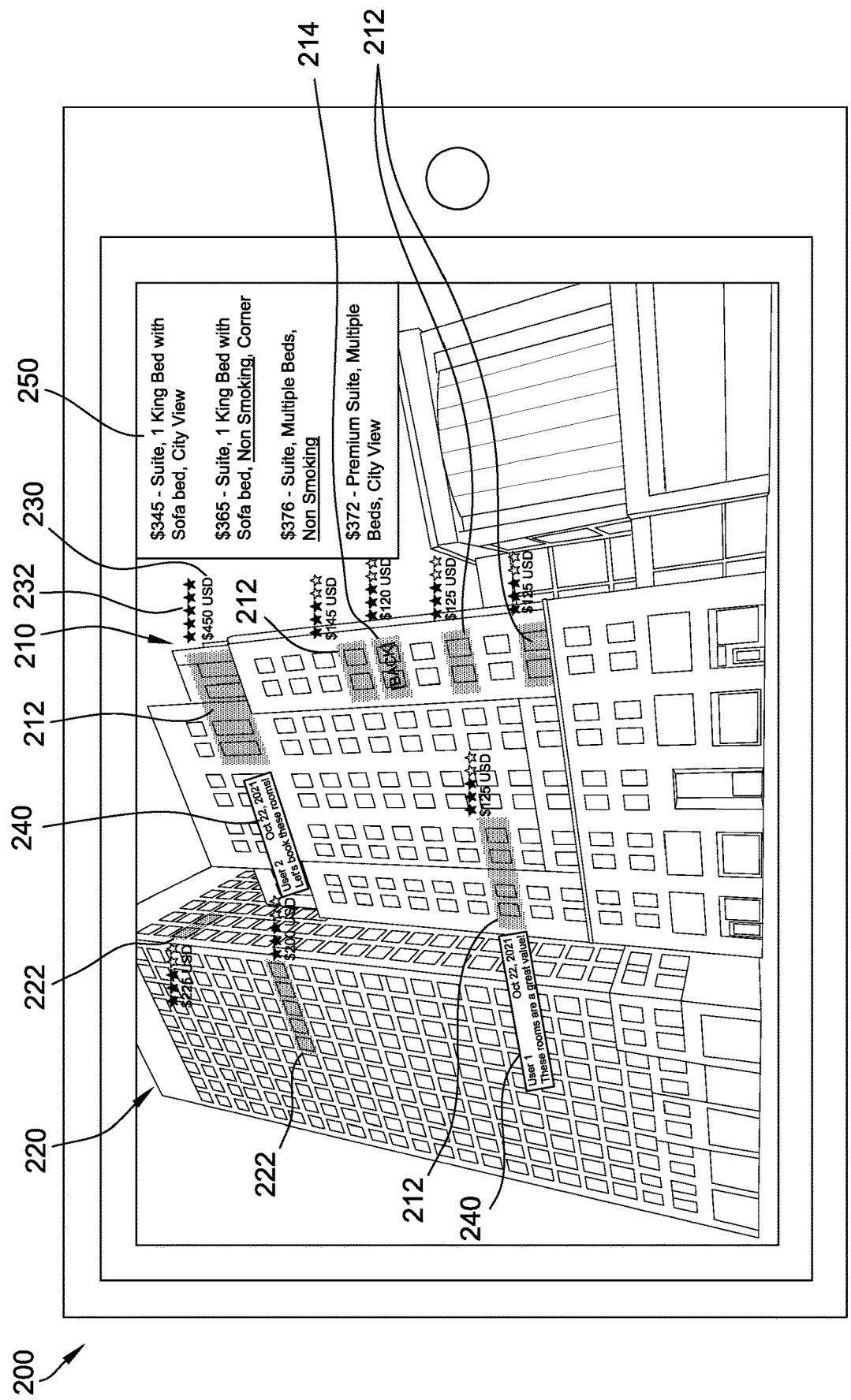

In the embodiment illustrated in FIG. 2, a display 200 (e.g., an AR display device 112) comprises a plurality of first see-through CG elements 212 which highlight available hotel rooms of a hotel 210 that is within user's 104 field of view 106. FIG. 2 further includes a second see-through CG element with a text indication 214, indicating that the highlighted portion refers to a location in the back of hotel 210. FIG. 2 also includes a plurality of third see-through CG elements 222 which highlight available office spaces in an office building 220. In some embodiments, user 104 may be physically standing in front of hotel 210 and office building 220 and user computing device 110 may capture an image or video of hotel 210 and office building 220. In other embodiments, user 104 may navigate to a satellite image, an aerial image, an interactive panoramic view of the street, or the like, via a web-enabled service, such as Google Maps by Google.

Figure 3:
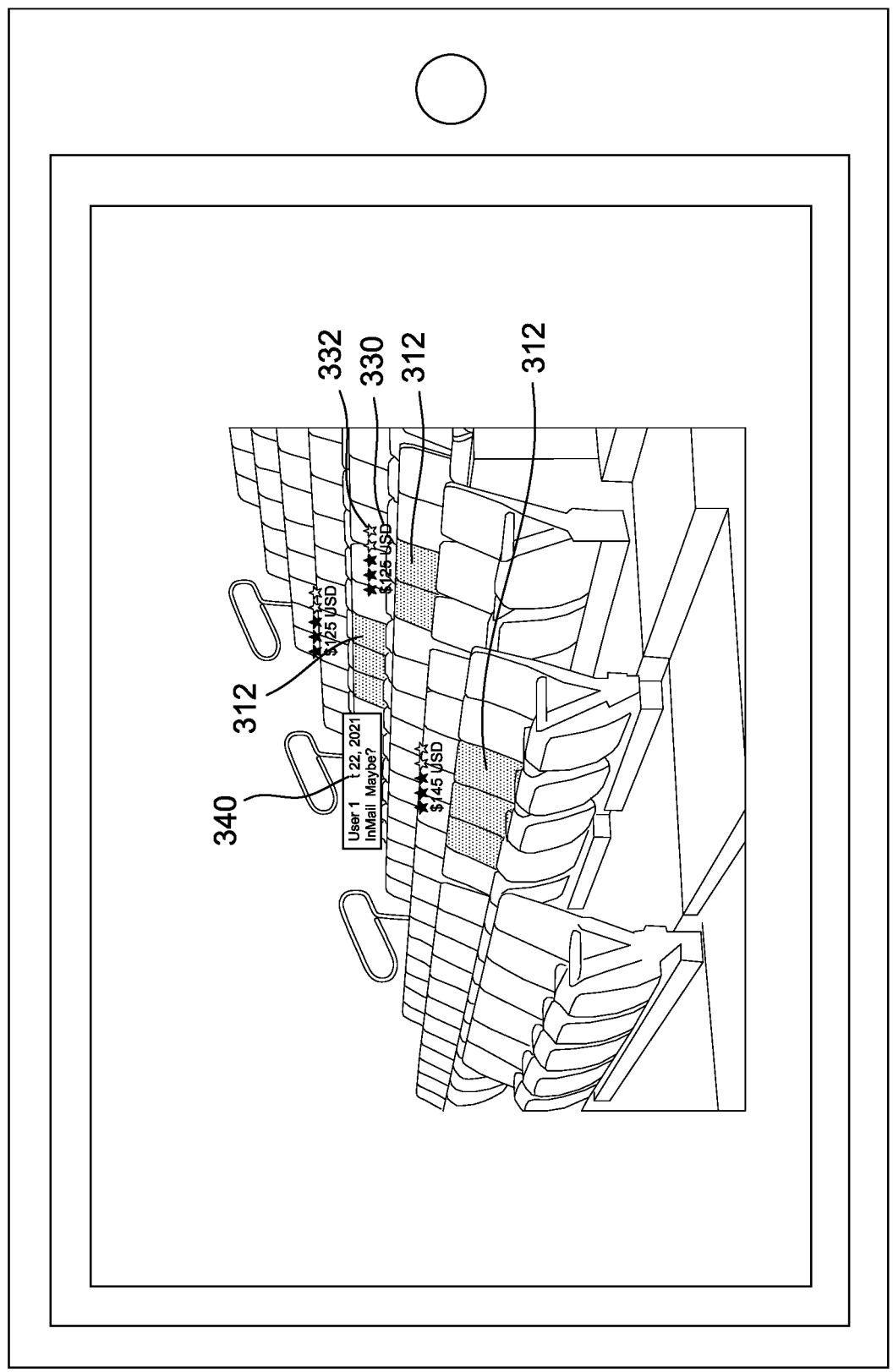

Similarly, in the embodiment illustrated in FIG. 3, a display 300 (e.g., an AR display device 112) comprises a plurality of first see-through CG elements 312 which highlight available seats in a section 310 of an arena. In some embodiments, user 104 may be physically standing in the arena and user computing device 110 may capture an image or video the arena seats. In other embodiments, user 104 may navigate to a satellite image, an aerial image, an interactive panoramic view of streets, or the like, via a web-enabled service, such as Google Maps by Google.

In some embodiments, one or more second-type CG elements include additional information about the highlighted unit(s). For example, the one or more second-type CG elements may comprise a price associated with the highlighted unit(s) (e.g., the cost per night, per week, per month or the cost for a particular event) and/or a rating associated with the one or more highlighted unit(s). The one or more second-type CG elements may be positioned next to the one or more first-type CG elements which highlight the unit(s). For example, in the embodiment illustrated in FIG. 2, each available room or group of rooms is accompanied by a price 230 and a rating 232. In some embodiments, this information and/or additional details may be listed in an informational CG element 250. Further, in the embodiment illustrated in FIG. 3, each available seat or group of seats is accompanied by a price 330 and a rating 332.

In some embodiments, AR computing device 120 may sync with contact data from a user's contact list stored on the user's computing device 110. AR computing device 120 may request and receive reservation data (e.g., hotel rooms, arena seating, office spaces, and the like) associated with the user's contacts. The AR computing device may generate CG elements (e.g., a see-through element) to show where a user's contact has booked a room, a seat, an office space, and the like.

In some embodiments, one or more third-type CG elements may comprise one or more communications (e.g., a messages from a user, a communication session between one or more users, or the like). In some embodiments, the communications are located on a sidebar with the display. Additionally, or alternatively, the communications are located on the real-world environment or the image of the real-world environment. For example, the user may select a location on the display, provide their message and/or comment, in order to provide their message or comments to another user or a group of users from the user's contacts. In this way, users can easily provide comments with regards to specific available reservations to another user or a group of users. For example, in the embodiment illustrated in FIG. 2, User 1 provided the comment "These rooms are a great value" next to a group of available hotel rooms and User 2 provided the comment "Let's book these rooms" next to another group of available hotel rooms.

In some embodiments, one or more CG elements (now shown) may comprise a link to a merchant web page or application which enables user 104 to easily book a room at a hotel, an office space, a rental, seats, and the like.

In some embodiments, one or more CG elements correspond to advertisements, discounts, and the like associated with one or more objects not within the user's field of view, but that are nearby. The advertisement and/or discount may be accompanied by an indication (e.g., an arrow) pointing in a direction of the corresponding object. The data sources may be associated with hotel companies, ticket sale and distribution companies, real estate sale, rental companies, crowd-source review companies, and the like.

In some embodiments, AR computing device 120 is configured to receive geolocation data (e.g., GPS location data, real time kinematic location data, and low earth orbit location data). In some embodiments, the geolocation data, image data, and/or metadata associated with the image data is used in the object recognition assessment. For example, if a user is physically present in front of an object, the geolocation data may pinpoint a location of user 104 and the image data may be used to determine what exactly user 104 is looking at. In another example, the geolocation data and the image data may be used to determine which arena user 104 is standing in and even where user 104 is standing within the arena. If a user is not physically present, and is instead looking at a satellite image, a satellite image, an aerial image, an interactive panoramic view, or the like of the object on a web browser, AR computing device 120 may use geolocation data and/or other metadata associated with the image to identify the object.

In some embodiments, AR computing device 120 is further configured to determine a user's 104 field of view 106 (e.g., what user 104 is looking at). In some embodiments, user computing device 110 and/or AR computing device 120 includes cameras, lidar, sonar, or radar devices, accelerometers, gyroscopes, and/or any devices used to collect sensor input data about the real-world environment near user 104. AR computing device 120 may receive image data, video data, lidar data, sonar data, radar data, accelerometer data, gyroscope data, and/or any other data about user's 104 environment from user computing device 110, and may process such data to determine user's 104 field of view 106. In some embodiments, AR computing device 120 receives sensor input data that includes video of the real-world environment, in particular, video that corresponds to the field of view 106 of user 104. AR computing device 120 may identify environmental features in the video data. In another embodiment, AR computing device 120 receives geolocation data and/or sensor input data that includes gyroscope and accelerometer data. AR computing device 120 may process the geolocation data, gyroscope data, and accelerometer data to determine the location of user 104 and field of view 106 of user 104, and may determine relevant objects or a group of objects that corresponds to the field of view 106 of user 104.

In some embodiments, AR computing device 120 determines a field of view 106 of user 104 and transmits image and/or video data and/or geolocation data to MP computing device 150 which determines one or more objects which appear within user's 104 field of view 106. MP computing device 150 may further determine one or more units within the one or more objects. Once objects and units within the objects are identified, AR computing device 120 is further configured to transmit an electronic request message to an API 140 for information associated with the one or more objects and/or units within the objects. For example, if MP computing device determines user 104 is looking at Hotel A located at 123 Main Street, Anywhere, USA, AR computing device may transmit a request to API 140 to retrieve pricing and rating information from the relevant server and/or data sources.

In some embodiments, AR computing device 102 is further configured to receive user inputs from user 102 via user computing device 110. In some embodiments, the user input data may include a date or a range of dates the user would like to make a reservation, a type of show, performance, concert, or sporting event the user would like to attend, a specific show, performance, concert, or sporting event the user would like to attend, a specific room, office space, seat, or the like the user would like to see further information on, and any other information that enables the AR system to function as described herein. AR computing device 120 may include the user input data in the request in order to retrieve the relevant information. Additionally, or alternatively, the user inputs may include instructions for adding a bounding frame around one or more objects or one or more units within an object, identifying an unidentified object, changing display options of the AR environment, or any other instruction from user 104. User inputs may be received through any combination of hand gestures, eye movements, spoken or audio commands, text inputs, mouse inputs, keyboard inputs, touchscreen inputs, and/or any other user inputs. AR computing device 120 is further configured to display other virtual elements not directly related to reservation and availability information, such as virtual elements associated with user inputs (e.g., bounding frames, hand gestures, and other illustrations of user inputs) and menu or other display data (e.g., menus, buttons, toolbars, or other controls).

In some embodiments, AR computing device 120 allows user 104 to simultaneously switch between AR and VR environments, such that user 104 may be viewing an AR environment and switch to a VR environment (e.g., VR environment), or vice versa. AR computing device 120 may seamlessly switch between displaying AR and VR environments to user 104 based upon user inputs, or some other external factor, such as a change in geolocation data or sensor input data. In one example, user 104 is viewing a street in an AR environment, such that a hotel located on the street are overlaid with one or more CG elements which provide information regarding availability and pricing of rooms within the hotel. However, user 104 may desire to see the location, availability, and pricing of hotel rooms located on the backside of a hotel without walking behind the hotel. As such, user 104 may input a command to navigate the view of the digital environment away from user's 104 real-world position, causing AR computing device 120 and MP computing device 160 to transition user 104 out of AR environment and into a VR environment which presents the location, availability, and pricing information of rooms located on the backside of the hotel.

Exemplary User Computing Device Configuration

Figure 4:
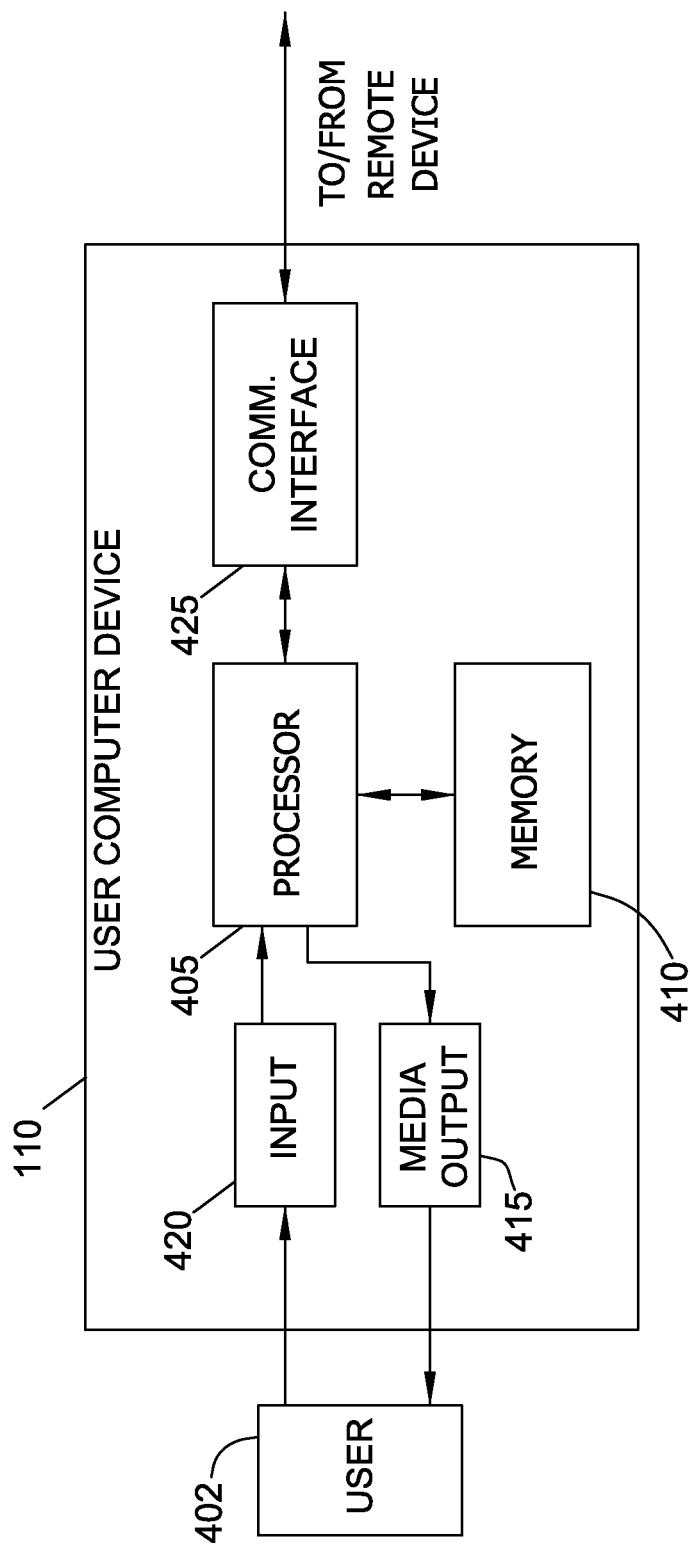

FIG. 4 illustrates an example configuration of a user computing device 110 (shown in FIG. 1). In some embodiments, user computing device 110 is configured to display AR data, such as CG elements. In the example embodiment, user computing device 110 includes a processor 405 for executing instructions. In some embodiments, executable instructions are stored in a memory 410. Processor 405 may include one or more processing units, for example, a multi-core configuration. Memory 410 is any device allowing information such as executable instructions and/or written works to be stored and retrieved. Memory 410 may include one or more computer readable media.

User computing device 110 also includes at least one media output component 415 for presenting information to user 402. User 402 may include, but is not limited to, user 104. Media output component 415 is any component capable of conveying information to user 402. For example, media output component 415 may be a display component, such as see-through display, a pair of goggles, a pair of glasses, one or more contact lenses, a handheld device or screen, a fixed screen (such as a vehicle windshield or other surface), or the like. In some embodiments, media output component 415 includes an output adapter such as a video adapter and/or an audio adapter. An output adapter is operatively coupled to processor 405 and operatively connectable to an output device such as a display device, a liquid crystal display (LCD), organic light emitting diode (OLED) display, or "electronic ink" display, or an audio output device, a speaker or headphones.

In some embodiments, AR display device 110 includes an input device 420 for receiving input from user 402. Input device 420 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, an iris reader/scanner, a retina reader/scanner, a profile scanner, a hand gesture reader/scanner, or the like. A single component, such as a touch screen, may function as both an output device of media output component 415 and input device 420. A single component such as a touch screen may function as both an output device of media output component 415 and input device 420. AR display device 110 may also include a communication interface 425, which is communicatively connectable to a remote device such as AR computing device 120 (shown in FIG. 1). Communication interface 425 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 410 are, for example, computer readable instructions for providing a user interface to user 402 via media output component 415 and, optionally, receiving and processing input from input device 420. A user interface may include, among other possibilities, a web browser and client application. Web browsers enable users, such as user 402, to display and interact with media and other information typically embedded on a web page or a website from AR computing device 120. A client application allows user 402 to interact with an AR computing device application from user computing device 110.

Exemplary AR Computing Device Configuration

Figure 5:
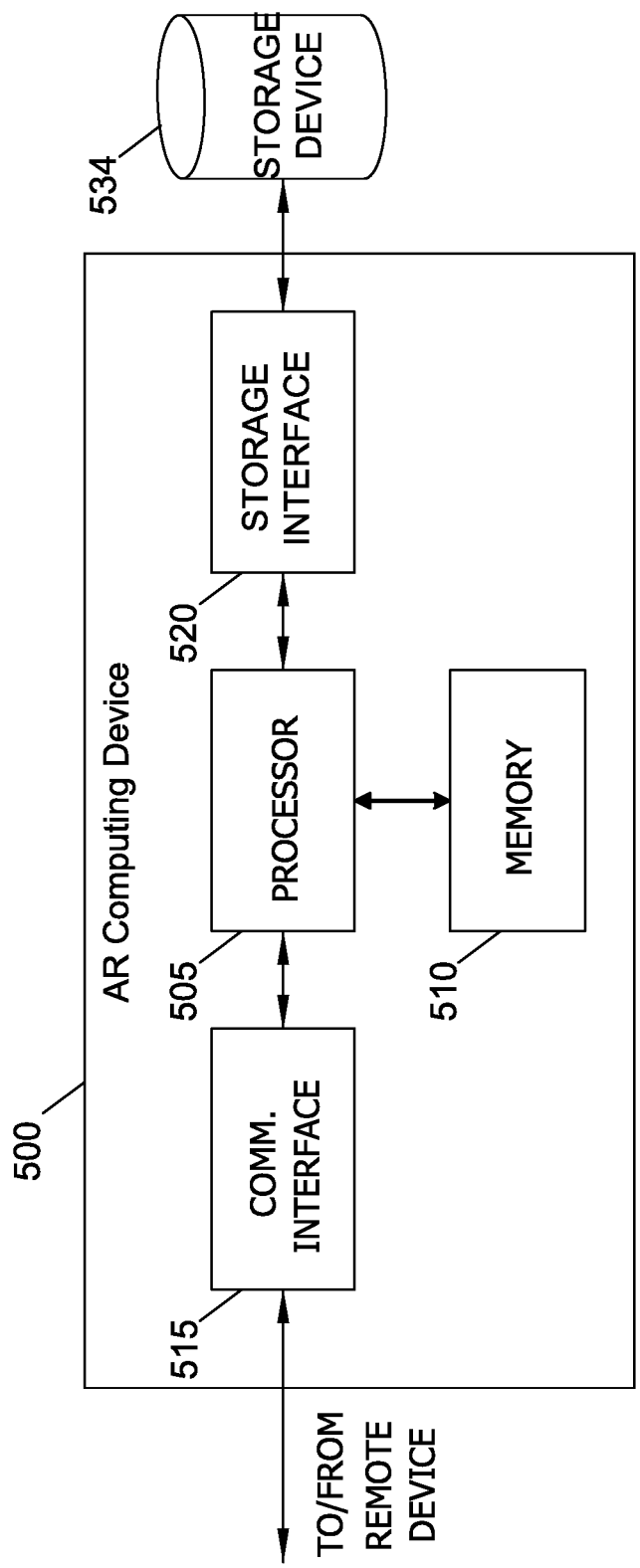

FIG. 5 illustrates an example configuration of an AR computing device 500, such as AR computing device 120 (shown in FIG. 1). AR computing device 500 may include, but is not limited to, database server 130 (shown in FIG. 1). In some embodiments, AR computing device 500 is similar to AR computing device 120.

AR computing device 500 includes a processor 505 for executing instructions. Instructions may be stored in a memory 510, for example. Processor 505 may include one or more processing units (e.g., in a multi-core configuration) for executing instructions. The instructions may be executed within a variety of different operating systems on the AR computing device 500, such as UNIX, LINUX, Microsoft Windows®, etc. More specifically, the instructions may cause various data manipulations on data stored in storage device 534 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that service provider AR computing device 500 is capable of communicating with a remote device, such as a user system or another AR computing device 500. For example, communication interface 515 may receive communications from API 140 via the Internet, as illustrated in FIG. 1.

Processor 505 may also be operatively coupled to a storage device 534. Storage device 534 is any computer-operated hardware suitable for storing and/or retrieving data. In some embodiments, storage device 534 is integrated in AR computing device 500. In other embodiments, storage device 534 is external to service provider AR computing device 500 and is similar to database server 130 (shown in FIG. 1). For example, AR computing device 500 may include one or more hard disk drives as storage device 534. In other embodiments, storage device 534 is external to AR computing device 500 and may be accessed by a plurality of AR computing device 500. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory 510 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Computer Implemented Method

Figure 6:
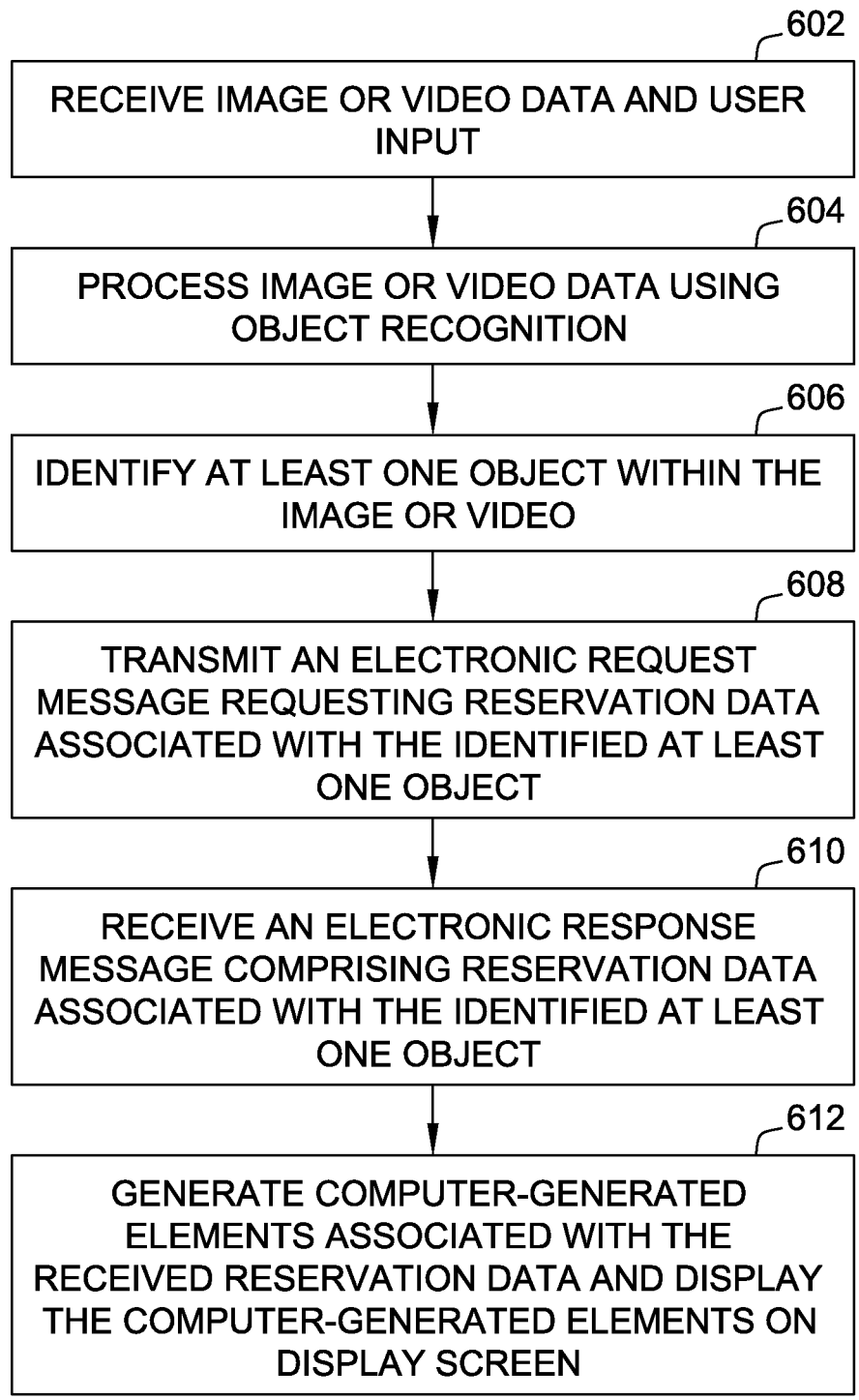

FIG. 6 is an example flow diagram illustrating a method flow 600 by which AR system 100 (shown in FIG. 1) generates augmented reality-based reservation content in the form of certain computer-generated (CG) elements superimposed onto the user's physical environment or an image of a physical environment (e.g., an image of a user's current physical environment, a satellite image, an aerial image, an interactive panoramic views of streets, and the like) using AR computing device 120 and user computing device 110 (both shown in FIG. 1) operated by user 104 (shown in FIG. 1).

Method 600 includes receiving 602, from user computing device 110 (shown in FIG. 1) image data or video data at least one network connection via AR display device 110. Receiving 602 may further comprise receiving user input from user computing device 110 (shown in FIG. 1) user input. User input may be received through any combination of hand gestures, eye movements, spoken or audio commands, text inputs, mouse inputs, keyboard inputs, touchscreen inputs, and/or any other user inputs. Receiving 602 may further comprise receiving geolocation data from user computing device 110 (shown in FIG. 1).

Method 600 also includes processing 604 the received image or video data using object recognition and identifying 606 at least one object within the image or video. The geolocation data may be used in the identifying 606 of the at least one object. Identifying 606 may further comprise identifying one or more units within the object.

Method 600 further includes transmitting 608, to an API, an electronic request message, the electronic request message requesting reservation data associated with the identified at least one object and/or units within the at least one object. Method 600 further includes receiving 610 an electronic response message comprising reservation data associated with the identified at least one object and/or units within the at least one object.

Additionally, method 600 further includes generating 612 computer-generating elements associated with the received reservation data and displaying the computer-generated elements on a display screen of user computing device 110 (shown in FIG. 1).

Exemplary Computing Device Diagram

Figure 7:
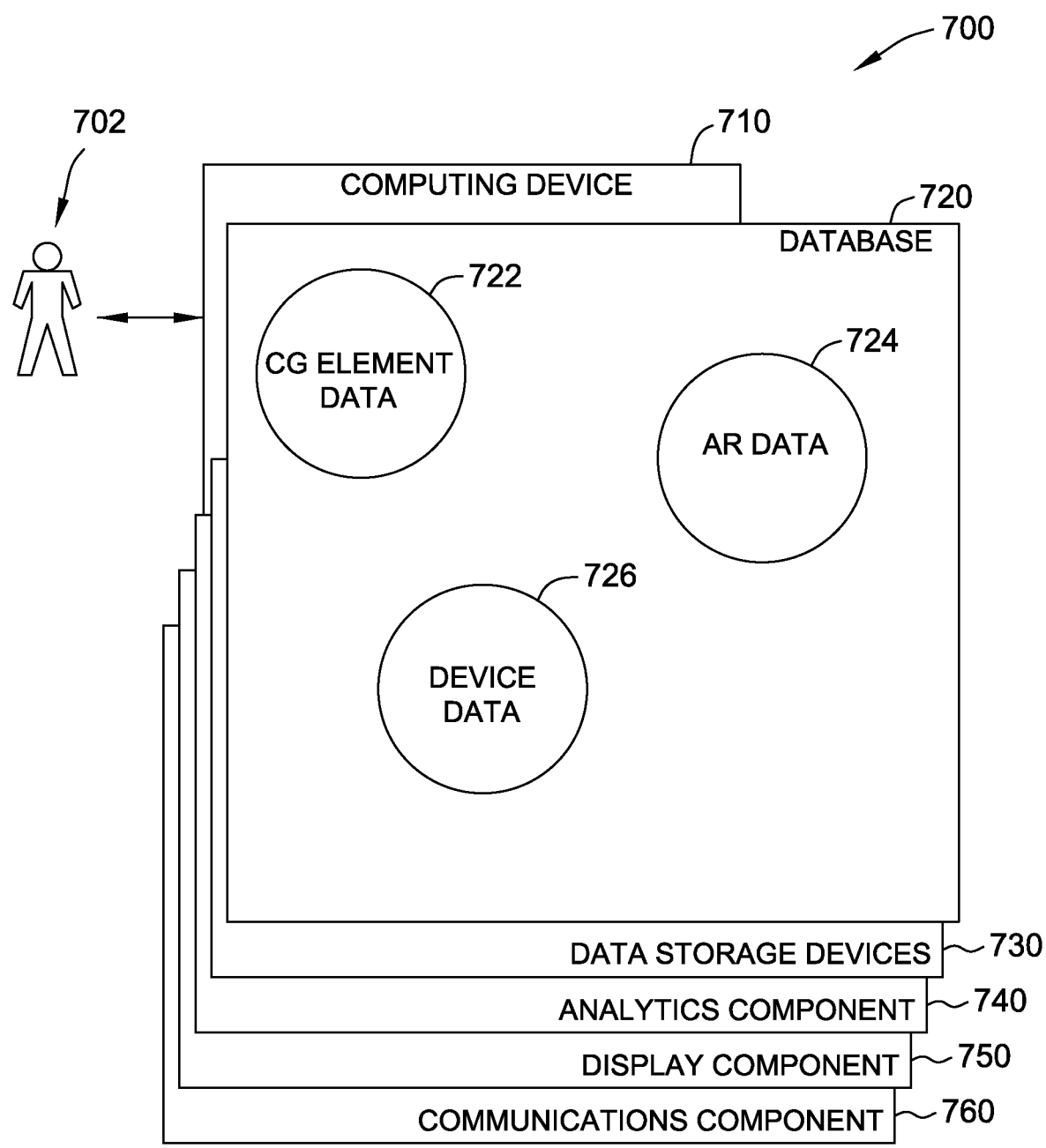

FIG. 7 shows an example configuration of a database 700 within computing device 710, along with other related computer components, that may be used to generate AR-based profiles and display CG elements using AR reservation data. In the example embodiment, computing device 710 is similar to AR computing device 120 (shown in FIG. 1). Operator 702 (such as a user 104 operating AR computing device 120, as illustrated in FIG. 1) may access computing device 710 in order to manage the AR reservation data for one or more other users 104 (such as the users inputting and/or viewing CG element data using AR display device 112, as illustrated in FIG. 1). In some embodiments, database 720 is similar to database 135 (shown in FIG. 1). In the example embodiment, database 720 includes CG element data 722, AR data 724, and device data 726. CG element data 722 includes data relating to current and prior computer-generated elements (e.g., recorded images of CG elements, resolutions, pixel values, color values, size values, associations with specific users, or the like). AR data 724 includes data regarding consumers registered with the reservation service, such as registered consumers 114 (shown in FIG. 1). AR data 724 may include availability data, rating data, pricing data, and the like. Device data 726 includes data relating to devices in communication with computing device 710 (such as devices in communication with AR computing device 120). Such devices may include AR display device 112, user computing device 110, payment processor computing device 140, or any other device in communication with computing device 710.

Computing device 710 also includes data storage devices 730. Computing device 710 further includes analytics component 740 that assists in generating CG elements. Computing device 710 also includes display component 750 that may be used by operator 702 to view the status of computing device 710. Computing device 710 also includes communications component 760 which is used to communicate with remote computer devices communicatively coupled to computing device 710, as described above. In some embodiments, communications component 760 is similar to communications interface driver 515 (shown in FIG. 5).

As will be appreciated based on the foregoing specification, the above-described embodiments of the disclosure may be implemented using computer programming or engineering techniques including computer software, firmware, hardware or any combination or subset thereof, wherein the technical effect is to display CG elements to a user to improve the reservation process by more easily providing relevant reservation information to consumers, and consequently provide a more seamless booking experience for consumers. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An augmented reality (AR) system for generating augmented reality content using an AR computing device and an AR display device operated by a user, the AR computing device being communicatively coupled to the AR display device and an application programming interface (API), the AR system configured to:
   receive, by the AR computing device from the AR display device, image data, at least one user input, and geolocation data;
   process, by the AR computing device, the image data using object recognition and the geolocation data to identify at least one object;
   transmit, by the AR computing device via the API, an electronic request message, the electronic request message requesting reservation data associated with the identified at least one object and the at least one user input;
   receive, by the AR computing device from the API, an electronic response message, wherein the electronic response message includes reservation data associated with the identified at least one object and the at least one user input;
   generate, by the AR computing device, AR content associated with the received reservation data, the AR content including a computer-generated indicator element configured to visually indicate a real-world location of the identified at least one object within a real-world environment in which the identified at least one object is present, wherein the real-world location of the identified at least one object is not viewable within a current real-world view of the user; and
   cause, by the AR computing device, the AR content to be displayed on a display screen of the AR display device.

2. The AR system of claim 1, wherein the object recognition comprises identifying the at least one object by inputting the image data and geolocation data into a machine learning model trained to perform object recognition in the real-world environment.

3. The AR system of claim 1, wherein the object recognition comprises identifying the at least one object using metadata associated with the image data and the geolocation data.

4. The AR system of claim 1, further configured to:
   identify, by the AR computing device, at least one unit within the at least one object, the at least one unit being associated with a reservation.

5. The AR system of claim 1, wherein the AR display device is configured to display the AR content (i) as part of an AR digital environment corresponding to the real-world environment and (ii) in the form of one or more computer-generated (CG) elements including the CG indicator element, and the AR system is further configured to:
   process a user input command to navigate a view of the AR digital environment away from the current real-world view of the user, causing the AR computing device to transition the user out of the AR environment and into a virtual reality (VR) environment which presents the identified at least one object in a manner that is viewable to the user.

6. The AR system of claim 5, further configured to:
   identify at least one unit within the at least one object, the at least one unit being associated with a reservation; and
   identify, based on the received reservation data, one or more available units, wherein the one or more CG elements highlight the one or more available units.

7. The AR system of claim 1, wherein the AR display device includes a see-through, near-eye, mixed reality display device.

8. The AR system of claim 1, wherein AR data associated with the AR content includes at least one of availability data, pricing data, or rating data.

9. The AR system of claim 1, further configured to:
receive, by the AR computing device, one or more advertisements or incentives for the identified at least one object; and
display the one or more advertisements or incentives on the display screen of the AR display device.

10. A computer-implemented method for generating augmented reality reservation content using an AR computing device and an AR display device operated by a user, the AR computing device being communicatively coupled to the AR display device and an application programming interface (API), the method comprising:
receiving, by the AR computing device from the AR display device, image data, at least one user input, and geolocation data;
processing, by the AR computing device, the image data using object recognition and the geolocation data to identify at least one object;
transmitting, by the AR computing device to the API, an electronic request message, the electronic request message requesting reservation data associated with the identified at least one object and the at least one user input;
receiving, by the AR computing device from the API, an electronic response message, wherein the electronic response message includes reservation data associated with the identified at least one object and the at least one user input;
generating, by the AR computing device, AR content associated with the received reservation data, the AR content including a computer-generated indicator element configured to visually indicate a real-world location of the identified at least one object within a real-world environment in which the identified at least one object is present, wherein the real-world location of the identified at least one object is not viewable within a current real-world view of the user; and
causing the AR content to be displayed on a display screen of the AR display device.

11. The computer-implemented method in accordance with claim 10, wherein the object recognition comprises identifying the at least one object by inputting the image data and geolocation data into a machine learning model trained to perform object recognition in the real-world environment.

12. The computer-implemented method in accordance with claim 10, wherein the object recognition comprises identifying the at least one object using metadata associated with the image data and the geolocation data.

13. The computer-implemented method in accordance with claim 10, further comprising identifying at least one unit within the at least one object, the at least one unit being associated with a reservation.

14. The computer-implemented method in accordance with claim 10, wherein the AR content is displayed (i) as part of an AR digital environment corresponding to the real-world environment and (ii) in the form of one or more computer-generated (CG) elements including the CG indicator element, the computer-implemented method further comprising:

processing a user input command to navigate a view of the AR digital environment away from the current real-world view of the user, causing the AR computing device to transition the user out of the AR environment and into a virtual reality (VR) environment which presents the identified at least one object in a manner that is viewable to the user.

15. The computer-implemented method in accordance with claim 14, further comprising:
identifying at least one unit within the at least one object, the at least one unit being associated with a reservation; and
identifying, based on the received reservation data, one or more available units,
wherein the one or more CG elements highlight the one or more available units.

16. The computer-implemented method in accordance with claim 10, wherein the AR display device includes a see-through, near-eye, mixed reality display device.

17. The computer-implemented method in accordance with claim 10, wherein AR data associated with the AR content includes at least one of availability data, pricing data, or rating data.

18. The computer-implemented method in accordance with claim 10, further configured to:
receive, by the AR computing device, one or more advertisements or incentives for the at least one identified object; and
displaying the AR content on the display screen.

19. A non-transitory computer readable medium that includes computer-executable instructions for generating augmented reality reservation content using an AR computing device and an AR display device operated by a user, the AR computing device being communicatively coupled to the AR display device and an application programming interface (API), wherein when the computer-executable instructions are executed by the AR computing device, the computer-executable instructions cause the AR computing device to:
receive, from the AR display device, image data, at least one user input, and geolocation data;
process the image data using object recognition and the geolocation data to identify at least one object;
transmit, to the API, an electronic request message, the electronic request message requesting reservation data associated with the identified at least one object and the at least one user input;
receive, by the AR computing device from the API, an electronic response message, wherein the electronic response message includes reservation data associated with the identified at least one object and the at least one user input;
generate AR content associated with the received reservation data, the AR content including a computer-generated indicator element configured to visually indicate a real-world location of the identified at least one object within a real-world environment in which the identified at least one object is present, wherein the real-world location of the identified at least one object is not viewable within a current real-world view of the user; and
cause the AR content to be displayed on a display screen of the AR display device.

20. The non-transitory computer readable medium in accordance with claim 19, wherein the computer-executable instructions further cause the AR computing device to identify at least one unit within the at least one object, the at least one unit being associated with a reservation.

* * * * *